(12) United States Patent
Find et al.

(10) Patent No.: US 10,562,050 B2
(45) Date of Patent: Feb. 18, 2020

(54) APPARATUS AND PROCESS FOR SPRAYING LIQUIDS AND PRODUCING VERY FINE MIST

(71) Applicant: hte GmbH the high throughput experimentation company, Heidelberg (DE)

(72) Inventors: Josef Find, Nuremberg (DE); Kurt-Erich Finger, Eppelheim (DE); Alfred Haas, Eppelheim (DE); Markus Friess, Lindenberg (DE); Oliver Koechel, Bubenheim (DE); Michael Dejmek, Birkenau (DE)

(73) Assignee: hte GmbH the high throughput experimentation company, Heidelberg (DE)

( * ) Notice: Subject to any disclaimer, the term of this patent is extended or adjusted under 35 U.S.C. 154(b) by 183 days.

(21) Appl. No.: 15/565,594

(22) PCT Filed: Apr. 13, 2016

(86) PCT No.: PCT/EP2016/058109
§ 371 (c)(1),
(2) Date: Oct. 10, 2017

(87) PCT Pub. No.: WO2016/166153
PCT Pub. Date: Oct. 20, 2016

(65) Prior Publication Data
US 2018/0111139 A1  Apr. 26, 2018

(30) Foreign Application Priority Data
Apr. 16, 2015 (DE) .................. 10 2015 206 843

(51) Int. Cl.
B05B 7/04 (2006.01)
B05B 7/16 (2006.01)
(Continued)

(52) U.S. Cl.
CPC ............ *B05B 7/0433* (2013.01); *B01J 8/1827* (2013.01); *B05B 7/16* (2013.01); *B01J 4/00* (2013.01); *B01J 2208/00902* (2013.01)

(58) Field of Classification Search
CPC ......... B05B 7/0433; B05B 7/16; B01J 4/002; B01J 8/0278; B01J 8/1827; B01J 2208/00902
See application file for complete search history.

(56) References Cited

U.S. PATENT DOCUMENTS 5,139,748 A * 8/1992 Lomas .................. B01F 5/0415
208/153
5,289,976 A * 3/1994 Dou ....................... B01J 8/1827
239/431
(Continued)

FOREIGN PATENT DOCUMENTS

DE 10 2007 054 949 A1 5/2009
DE 10 2010 012 555 A1 9/2011
(Continued)

OTHER PUBLICATIONS

International Search Report dated Jun. 15, 2016 in PCT/EP2016/058109 filed Apr. 13, 2016.
(Continued)

*Primary Examiner* — Darren W Gorman
(74) *Attorney, Agent, or Firm* — Oblon, McClelland, Maier & Neustadt, L.L.P.

(57) ABSTRACT

An apparatus and process for spraying liquids and producing very fine mist with the apparatus, the apparatus including: a needle injector that includes a capillary line (1) and an outer tube (8); a liquid supply (5); and a gas supply (4), where: the capillary line (1) is arranged in the interior space of the outer tube (2); the internal diameter of the capillary line in the needle injector is in the range of 2-1000 μm; the capillary line is in active communication with a gas supply (4); and
(Continued)

the outer tube (2) is in active communication with a liquid supply (5).

13 Claims, 3 Drawing Sheets

(51) Int. Cl.
  *B01J 4/00* (2006.01)
  *B01J 8/18* (2006.01)

(56) References Cited

U.S. PATENT DOCUMENTS

| | | | |
|---|---|---|---|
| 5,868,322 | A | 2/1999 | Loucks, Jr. et al. |
| 6,069,012 | A | 5/2000 | Kayser |
| 6,119,953 | A | 9/2000 | Gañán-Calvo et al. |
| 6,142,457 | A | 11/2000 | Holtan et al. |
| 6,174,469 | B1 | 1/2001 | Gañán-Calvo et al. |
| 6,241,159 | B1 | 6/2001 | Gañán-Calvo et al. |
| 7,063,982 | B1 * | 6/2006 | Karlsson ............. B01J 19/0046 422/130 |
| 8,999,246 | B2 * | 4/2015 | Chan ...................... B01J 8/1827 422/139 |
| 2011/0203973 | A1 | 8/2011 | Li et al. |
| 2012/0022287 | A1 * | 1/2012 | Subramaniam .......... B01J 4/002 562/415 |

FOREIGN PATENT DOCUMENTS

| | | |
|---|---|---|
| DE | 10 2013 019 441 A1 | 5/2015 |
| ES | 2 187 387 A1 | 6/2003 |
| WO | 02/099415 A1 | 12/2002 |
| WO | 2010/018261 A1 | 2/2010 |
| WO | 2014/099312 A1 | 6/2014 |

OTHER PUBLICATIONS

International Search Report and Written Opinion dated Jun. 15, 2016 in PCT/EP2016/058109 with English language translation and English translation of categories of cited documents).
Searah Report dated Mar. 8, 2016 In German Patent Application No. 10 2015 206 843.9 (with English translation of catagories of cited documents).
A. Corma, et al., "A New Continuous Laboratory Reactor for the Study of Catalytic Cracking", Applied Catalysis A: General, vol. 232, 2002, pp. 247-263.

* cited by examiner

Figure 2.a 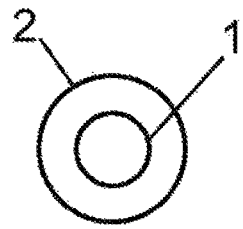
Figure 2.b 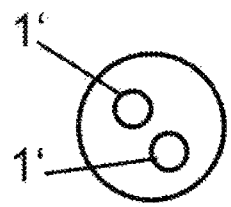
Figure 2.c 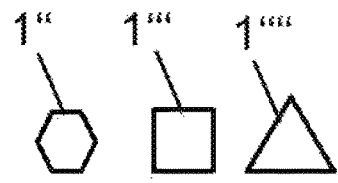
Figure 3
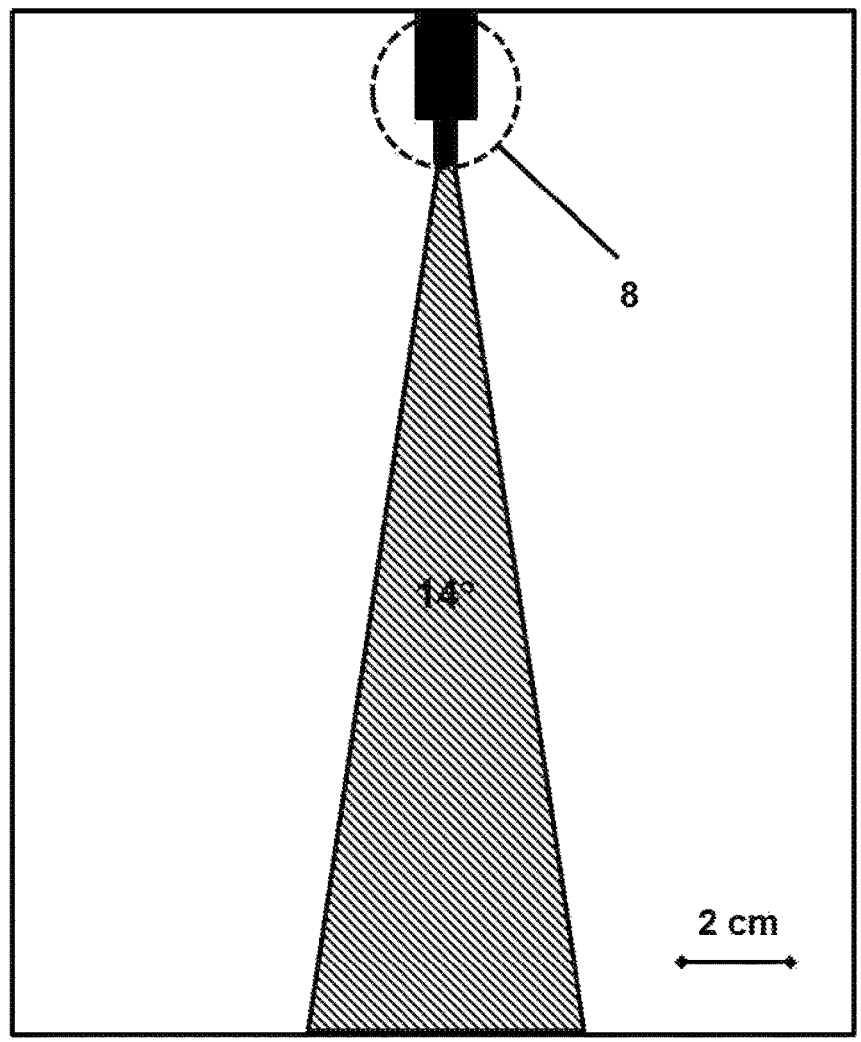

APPARATUS AND PROCESS FOR SPRAYING LIQUIDS AND PRODUCING VERY FINE MIST

CROSS-REFERENCE TO RELATED APPLICATIONS

The present application is a 35 U.S.C. § 371 national stage patent application of International patent application PCT/EP2016/058109, filed on Apr. 13, 2016, the text of which is incorporated by reference, and claims the benefit of the filing date of German application no. 10 2015 206 843.9, filed on Apr. 16, 2015, the text of which is also incorporated by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

The invention relates to an apparatus and a process for spraying liquids and producing very fine mist.

A field of application of the invention is in the field of catalyst research and catalyst testing setups on the laboratory scale, in which liquid starting materials are brought into contact with catalysts in order to react the former under controlled conditions. The improvement of laboratory methods is of great economic and industrial importance since it enables significantly cheaper experimental data to be obtained than is the case for pilot plants and production plants. Further fields of application relate to the wetting and impregnation of pulverulent support materials with liquids. The liquids or the impregnation solution can comprise active components or active compounds in dissolved form which can be applied to the solids by means of the process according to the invention. The surface properties of the pulverulent solids can thus be modified in a controlled manner.

Description of the Related Art Including Information Disclosed Under 37 CFR 1.97 and 1.98

A big industrial challenge in the catalytic conversion of feedstocks in fluidized catalyst beds then arises if the starting materials are difficult to handle. This is then in particular the case if the starting materials are oils or even heavy oils, which are difficult to process. The most important process for processing petroleum and vacuum gas oils (VGOs) in industry is the conversion thereof in the FCC process, i.e. the fluid catalytic cracking process. The vacuum gas oils originate from the vacuum distillation of petroleum, in which the low boilers are removed. The process using FCC catalysts is carried out in riser reactors in which catalyst streams composed of catalyst particles and gas are brought into contact with oil and reacted. The catalyst particles have an average particle size in the range from 60 to 100 µm (or from 60 to 150 µm). The reactions proceed at temperatures above 495-565° C., with the contact times being 20 seconds and less. Medium-sized FCC plants have a charge comprising 100-200 metric tons of catalyst, with a catalyst stream of 0.5 to 2 t/h circulating in these plants.

In particular, the examination of FCC catalysts in laboratory catalyst testing setups is also of great industrial importance. In the case of laboratory catalyst testing setups, a distinction is to be made between those test setups in which the catalysts are tested in a fixed bed and those in which the catalysts are tested in fluidized catalyst beds. Examination of catalysts in fixed beds is suitable when from 0.5 to 5 g of catalysts per catalytic cracking experiment is available. In the case of fluidized catalyst beds, a further distinction is to be made between statically fluidized beds and dynamically fluidized beds. As an example of fixed-bed testing, reference may be made to the ASTM method No. ASTM D-3907-86.

As an example of the examination of FCC catalysts in statically fluidized catalyst beds, mention may be made of the catalyst testing apparatus disclosed by John Kayser in U.S. Pat. No. 6,069,012. The amount of catalyst used here for each catalytic cracking experiment is in the range from 5 to 12 g.

An example of test setups with dynamically fluidized catalyst beds is the micro-downer unit disclosed by Corma et al. in ES 2187387. The catalyst stock vessel can, depending on the design, accommodate an average of from 100 to 500 g of catalyst. The catalyst has a flow rate of from 10 to 100 g per minute. In a publication by Corma et al. (in Applied Catalysis A: General 232 (2992) pp. 247-263), a schematic depiction of a reactor for examining FCC catalysts, which is equipped with a downcomer tube reactor, is given. The oil is sprayed into the reactor by means of an injector, with the oil feed being supplied by means of an injection pump. The feed line for the oil is also connected to a gas line so that either oil feed or gas feed can be introduced into the injector as desired.

As regards the oil injector, the laboratory catalyst testing setups often have an aspect in common, namely that the oil injector disclosed in U.S. Pat. No. 6,069,012 consists of two tubes, with a smaller inner tube being passed through a larger outer tube. The oil is then sprayed through the small inner tube into the reaction space, with a gas stream being conveyed through the outer tube at the same time. The collision of the oil stream with the gas stream results in partial mixing. The gas stream is started before introduction of the oil feed stream and is only stopped after the oil flow has been stopped, so that the formation of oil residues at the ends of the tubes is avoided. The amounts of oil to be injected per experiment are in the range from 0.5 to 5 ml. Oil injection is usually carried out by means of injection pumps. To quantify the amount of oil, the injection pumps can optionally be weighed or subjected to a calibration.

Various apparatuses and processes for atomizing liquids, which can be employed in various industrial fields, have been described in the prior art. An example which may be mentioned is the production of spray mists as samples for analytical examinations, the application of surface coatings by spray processes and also the work-up of crude oils. In the following, some apparatuses and processes for producing spray mists will be briefly presented in more detail.

The U.S. Pat. No. 6,241,159 B1 by A. Alfonso Ganán-Calvo et al., which was filed on Aug. 16, 2000, describes and claims a process for atomizing liquids, in which suitable geometric parameters and physical properties are used in order to ensure that the liquid is released in the form of a continuous laterally capillary-like microjet through an orifice plate. The process is based on the ejection effect which results from a liquid-gas interface when the gas is ejected at a point in the vicinity of the liquid surface. The process of the invention can be applied to all processes which concern the homogeneous atomization of liquids. One field of application is the electronic injection of fuel. In the process, the liquid is passed through a first channel and ejected from this in the form of a jet. The ejected liquid is entrained by a gas jet and is conveyed together with the latter through an orifice.

The U.S. Pat. No. 6,142,457 by Holtan et al., which was filed on Jan. 30, 1998, relates to a spray nozzle and a method of atomizing liquid feeds. In particular, the invention relates to a method of atomizing hydrocarbon-comprising feeds which are fed into the catalytic cracking zone of fluid catalytic cracking (FCC) processes. The nozzle comprises a primary passage by which a liquid stream is taken up and a secondary passage by which a diluent medium is taken up. The diluent medium and the liquid stream are combined in a mixing zone which is localized between the outlet of the first passage and the outlet of the second passage. The hydrocarbon-comprising feed is, in this method, conveyed through that passage which is located in the interior of the nozzle. The diluent medium is conveyed through the annular space arranged between inner and outer passage.

The US patent application US2011/0203973 by Li et al., which was filed on Feb. 23, 2010, relates to a process in which dispersions composed of supercritical liquid and oil are used in order to work up the hydrocarbon-comprising feeds which, for example, consist of heavy oils. The process is based on the use of a capillary mixer to produce dispersions. The capillary mixer comprises a capillary in the interior of the mixer, through which the oil is conveyed. The capillary in the interior space and also the tip of the capillary are surrounded by the supercritical liquid which flows in the same direction as the oil in the interior of the capillary. In order to achieve a very high throughput, which is necessary for the work-up of oils, it is necessary to use a large number of capillary mixers simultaneously in a parallel arrangement. Li et al. indicate that, in a preferred embodiment, 100 or even 1000 capillary mixers can be operated in parallel.

The US patent application U.S. Pat. No. 5,868,322 by Loucks Jr. et al. filed on Sep. 27, 1996 describes an apparatus for producing liquid droplets which comprises a mechanically fixed inner microtube conduit. The liquid droplets in the form of microscopically fine mist droplets may be utilized for producing samples which are subjected to a subsequent analysis. This can constitute MS, AA, ICP, CE/MS or similar analytical methods. The apparatus has a mechanically stabilized microconduit, through which the liquid is conveyed, in the interior. The outer conduit which encloses the inner microconduit has a constriction at the tip.

In the PCT application WO 2014/099312 A1, Anthony Mennito et al. describe an analytical method for characterizing saturated components of petroleum or hydrocarbons by means of mass spectroscopic processes which comprise high-boiling components and in which ionization by means of laser desorption is utilized. The introduction of the petroleum sample dissolved in toluene is effected through a syringe needle having a microsyringe, with the syringe needle being heated. To produce a very fine mist, nitrogen-comprising gas is introduced as cofeed from a heated steel needle. Further desolvation is effected by countercurrent flow of a stream of nitrogen.

The German patent application DE 10 2007 054 949 A1 by Schimkus et al., which was filed on Nov. 17, 2007, relates to a spray gun having a double cannula for spraying paints. The double cannula forms a spray lance, with the liquid paint or surface coating being conveyed through the inner capillary and the gas being conveyed through the outer tube of the spray lance. It can be seen from FIG. 2 that the circular end face of the inner capillary and the annular end face of the outer tube are in one plane. As an advantage of the spray lance, it is also mentioned that the lance can be angled or curved, which allows the application of paint to be carried out in a controlled manner at places in which spatial accessibility is limited.

Furthermore, the German patent application DE 10 2010 012 555 A1 by Prof. Peter Walzel filed on Mar. 23, 2010 relates to a two-fluid inner mixing nozzle arrangement and a process for the atomization of liquids. The nozzle according to the invention makes it possible to produce spray mists having small droplet dimensions, which after atomization have a droplet dimension in the range from 1 to 10 microns. A plurality of capillary conduits through which the liquid is conducted are arranged in the interior space of the nozzle. The capillary conduits, around which a gas stream flows, end in a joint interior mixing space. The end of the interior mixing space is formed by a nozzle opening.

In the PCT application WO 02/099415 A1, the inventors Paul O'Connor et al. describe the introduction of oil into a laboratory riser reactor by means of a high-pressure pump. The PCT application WO 02/099415 A1 originates from the Akzo company. The advantage of high-pressure injection is that a very short contact time, in the present case less than 8 seconds, can be achieved when short injection times in the range of less than 2 seconds are employed. A nozzle for introduction of feed and fluidizing gas is depicted in FIG. 1 of WO 02/099415 A1. The nozzle is connected to a high-pressure pump. Here, atomization is produced by a controlled pressure drop of a few hundred bar, by pushing or depressurizing the fuel through a narrow point. The fuel is thus conveyed through a narrow conduit. The feed is injected via a nozzle which is surrounded by a stream of nitrogen.

In the patent application DE 102013019441, the inventors Oliver Schulz et al. describe an atomizer system for two-phase systems with internal mixing. The advantage of the atomizer with mixing chamber is the uniform planar application of aerosols with particles as opposed to an atomizer system without mixing chamber.

BRIEF SUMMARY OF THE INVENTION

It is an object of the invention to provide an apparatus and a process by means of which laboratory catalyst testing setups for the catalytic reaction of liquid starting materials can be improved. In particular, the experimental conditions which relate to the reaction of oils such as VGO should be improved. A further object is to provide an apparatus which allows improved control in the introduction of liquids.

The objects mentioned here are achieved by provision of an apparatus for spraying liquids, which comprises a needle injector, a liquid supply (5) and a gas supply (4), where the needle injector comprises at least one capillary line (1) and at least one outer tube (2). In the needle injector, the internal diameter of each capillary line (1) is in the range of 2-1000 µm, more preferably in the range of 4-500 µm, more preferably in the range of 5-250 µm, and the capillary line is coaxially arranged in the interior space of the respective outer tube (2), the capillary line (1) is in active communication with the gas supply (4) and the outer tube is in active communication with the liquid supply (5).

BRIEF DESCRIPTION OF THE SEVERAL VIEWS OF THE DRAWINGS

FIG. 2.*a*: Schematically shows the cross section through the injector of the apparatus of the invention, with the injector having a capillary line (1) and an outer tube (2).

FIG. 2.*b*: Schematically shows the cross section through the injector of the apparatus of the invention, with the injector having two different capillary lines (1') and (1') and also an outer tube (2).

FIG. 2.*c*: Schematically shows the cross sections of variously configured capillary lines having a hexagonal shape (1"), a square shape (1''') and a triangular shape (1'''').

FIG. 3: Shows a photograph of the injector tip (8) in the operating state, with a colored solution being sprayed by means of the apparatus of the invention. The spray cone has an opening angle of 14°. Individual droplets cannot be resolved optically.

DETAILED DESCRIPTION OF THE INVENTION

Figure 1:
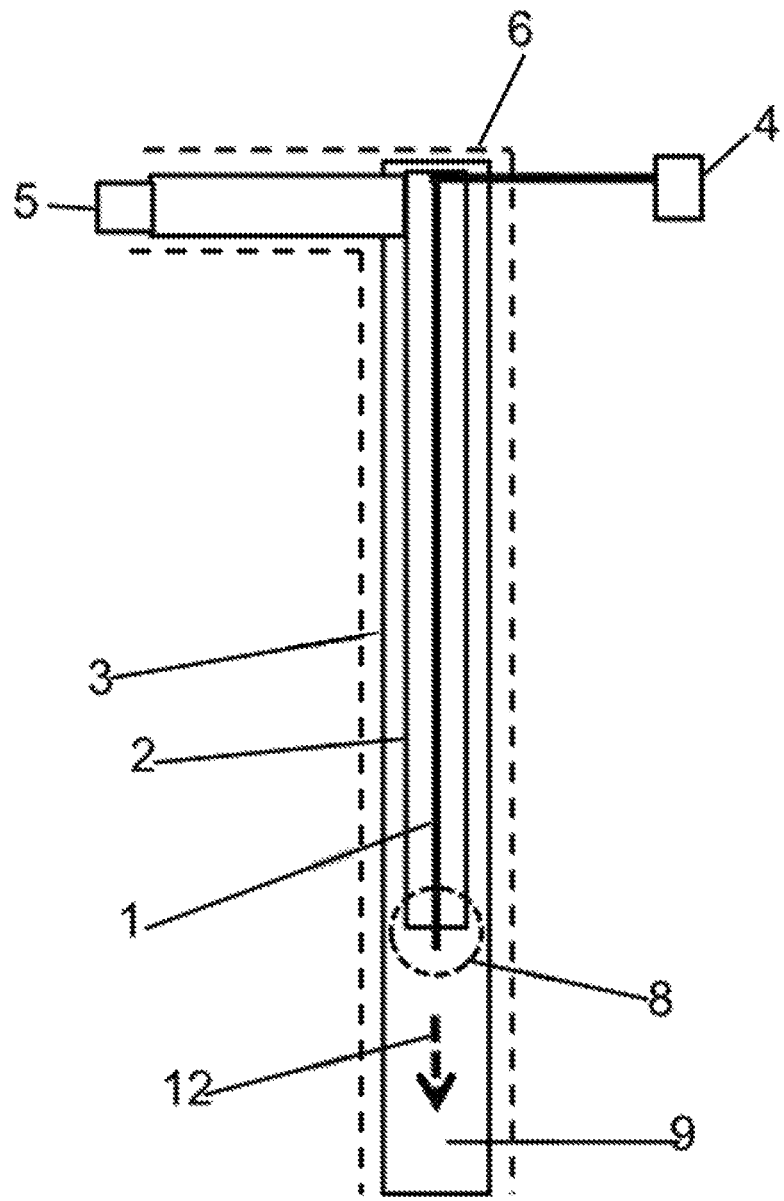
FIG. 1: Schematically shows the apparatus of the invention for spraying liquids having a capillary line (1) and outer tube (2), with the apparatus being arranged in a tubular housing (3). The tubular housing is surrounded by a heating device (6).
Figure 4:
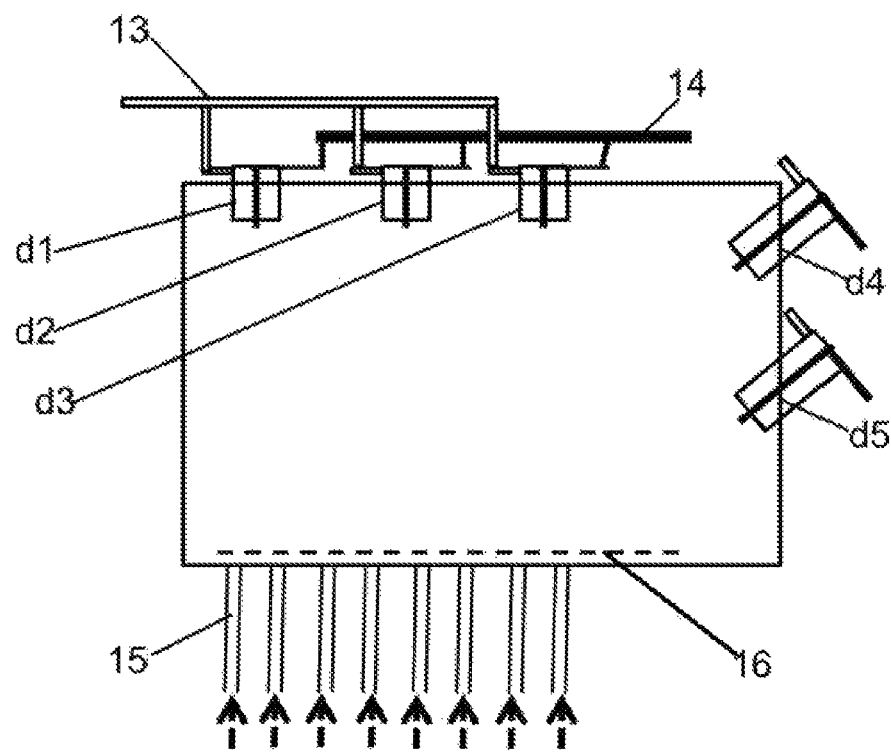
FIG. 4: Schematically shows the apparatus of the invention for spraying liquids in an arrangement having a plurality of apparatuses. In the present case, the apparatuses for spraying liquid are used in a setup for impregnating catalysts, with the setup having three apparatuses (d1, d2, d3) at the top and two lateral apparatuses (d4, d5).

In a preferred embodiment, the apparatus of the invention is joined to a housing, preferably a tubular housing (3), with preference being given to the housing being in active communication with a heating device (6).

The tip (8) of the apparatus is preferably configured in such a way that the length difference between the capillary line (1) and the outer tube (2) is in the range of 0-10 mm, with the length difference preferably being in the range of 1-5 mm and the capillary line (1) preferably being longer than the outer tube (2).

In the apparatus of the invention, the tip (8) of the needle injector does not have an internal mixing chamber. The mixture of liquid and gas thus goes directly into the outer region of the needle injector without entering a mixing chamber. The absence of a mixing chamber is advantageous since the configuration of the apparatus without mixing chamber is associated with a smaller engineering outlay than an injection apparatus equipped with a mixing chamber. In addition, the apparatus of the invention is also very robust.

In addition, preference is given to the apparatus being operated in conjunction with a catalyst testing setup for examining FCC catalysts and/or an aging or impregnation unit for FCC catalysts.

In this preferred embodiment as catalyst testing setup or as impregnation apparatus, the apparatus according to the invention is connected to a tubular housing (3).

The invention also provides a process for spraying liquids, which is carried out by means of the apparatus of the invention, wherein the process comprises the following steps:
(i) controlled introduction of a gas by means of the gas supply (4) into a capillary line (1),
(ii) controlled introduction of a liquid by means of the liquid supply into the interior space of an outer tube (8),
(iii) contacting of the liquid conveyed through the outer tube (8) with the gas conveyed through the capillary line (1) at the tip (8) of the apparatus.

Furthermore, in the process for spraying liquids, the liquid which is conveyed through the outer tube (2) has a volume flow in the range of 0.1-500 ml/min, preferably in the range of 0.5-250 ml/min, and/or the gas which is conveyed through the capillary line (1) has a volume flow in the range of 10-10 000 ml/min, preferably in the range of 20-2000 ml/min.

In a preferred embodiment, the supply or introduction of gases or liquids is carried out with these being heated. For the heating, regions of the housing, the gas supply and/or the liquid supply are heated, with the temperature of the gas supply being in the range of 50-300° C., preferably in the range of 100-250° C.; the temperature of the liquid supply being in the range from 50 to 300° C., preferably in the range from 100-250° C.; and the temperature of the housing (3) being in the range of 80-700° C., preferably in the range of 100-650° C., more preferably in the range of 150-550° C.

In the process of the invention, the atomization of the liquid, preferably the oil, is effected without a nozzle. The needle injector preferably has a tubular or stump-like tip as shown in FIG. 1. The needle injector will hereinafter also be referred to as coaxial needle injector. In a preferred embodiment, heavy oils such as VGO, HVGO are sprayed by means of the process of the invention.

The longitudinal axis of the coaxial needle injector comprising at least the capillary line (1) and the outer tube (2) is preferably arranged vertically.

In a preferred embodiment, the process of the invention is carried out using an apparatus in which a plurality of apparatuses (d1, d2, d3, . . . ) for the injection of liquids are installed.

In the process of the invention, the gas is conveyed with a high linear velocity through the inner tube and at the exit point has a linear velocity of >170 m/s (i.e. greater than or equal to 170 m/s) given by the ratio of volume flow to cross-sectional area of the inner tube and is greater than mach 0.5, preferably greater than mach 0.7, in particular greater than mach 1.0. The mach number is a mathematical parameter which is derived from the volume flow through the cross-sectional area at the upper end of the capillary (i.e. the exit area).

The high linear velocity of the gas is an essential element of the process of the invention. The high linear velocity can be achieved by the inner tube being formed by a capillary line. The capillary also has to be controlled by means of an appropriate admission pressure in order to convey a sufficient amount of gas through the capillary. One parameter of the process of the invention is given by the ratio of the volume flow of the gas stream to the volume flow of the liquid, with a preferred gas volume flow having a volume flow of 80 ml/min and a preferred liquid volume flow being 5 ml/min. The ratio of gas volume flow to liquid volume flow is thus 16, the ratio of gas volume flow to liquid volume flow preferably being in the range of 500-1, more preferably in the range of 10-200, particularly preferably in the range of 12-100.

It can be seen from the technical parameters that, in a preferred embodiment of the process of the invention, the very fine mists produced by means of the process have a very low mass flow ratio of gas to liquid. The mass flow ratio of gas to liquid is preferably <0.1, more preferably the mass flow rate of gas to liquid is <0.04. The mass flow is here reported (by way of example) in kg/h, with the units in the reported mass flow ratio being abbreviated and becoming redundant. This process aspect or parameter produces a significant difference compared to the processes described in the prior art. Another advantage here is that the very fine mists produced have low flows and very small amounts of gases and of liquids are consumed.

It is also possible to use alternative embodiments of capillaries. These consist, for example, of thin tubes which are provided at the ends with orifice plates and micropins. The use of capillaries is, however, particularly preferred. Capillaries having various diameters and lengths can be purchased. In particular, capillaries having small internal diameters are also available. In the context of the invention, high gas exit velocities are of great importance and these can be achieved particularly readily by means of capillaries. For the purposes of the present invention, high gas exit velocities are, in particular, exit velocities which are greater than or equal to mach 1.5, preferably greater than or equal to mach 2.0. (The mach number is determined as indicated above.)

It should be mentioned that in the process of the invention, the amount of gas which is conveyed through the inner tube is, on a mass basis, 18 times smaller than the amount of gas used in coaxial two-phase atomizers as are known in the prior art or are commercially available.

As regards the volume flow, this means that the gas conveyed through the inner tube has a volume which is a factor of 16 smaller than in the case of the two-phase atomizers known in the prior art. In relation to the process of the invention, it can also be said that an important characteristic of the invention is that a spray mist which firstly has only a low flow rate and secondly contains an extremely fine dispersion of liquid droplets is produced.

The combination of the apparatus of the invention and the process of the invention for the injection of oils results, in connection with use in conjunction with agitated catalyst beds, in synergy effects, by means of which particularly homogeneous wetting of the catalyst particles which cannot be achieved by means of the injectors known from the prior art is made possible. Furthermore, the use in conjunction with dynamically agitated catalyst beds in downcomer tubes or in riser reactors is also preferred since in this case improved control of injection is of critical interest for the quality of the experimental test data.

With regard to a preferred embodiment of the liquid supply (5), it can be said that this comprises a pump or a syringe and also a stock vessel with liquid. Particular preference is given to a liquid supply (5) which has a pump. The pump is more preferably a high-pressure pump (for example an HPLC pump).

In a preferred embodiment, the gas supply (4) comprises a gas supply network and a pressure regulator.

In addition, preference is given to an embodiment in which the liquid supply (5) and/or the gas supply (4) is connected to a process control system (PCS). The parameters of the process can be controlled or regulated by means of the process control system. The parameters include the duration of the introduction of the spray mist by means of the apparatus of the invention, the flow rate of the gas stream and the flow rate of the liquid to be metered in. in a preferred embodiment, introduction of the spray mist can be carried out continuously. In another embodiment, which is likewise preferred, the introduction can be carried out in the form of metered pulses. Furthermore, continuous introduction and introduction in pulses can be carried out alternately.

A preferred field of use of the invention relates to use of the apparatus for the injection of oils in connection with laboratory catalyst testing setups. Particular preference is given to laboratory catalyst testing setups for testing FCC catalysts; here, the use in connection with laboratory catalyst testing setups which have an agitated catalyst bed is particularly preferred. Particular preference is also given to riser reactors or downcomer tube reactors.

A further preferred field of use of the apparatus of the invention and the process of the invention is in connection with apparatuses for the controlled deactivation of FCC catalysts, in which the catalysts are impregnated with oils or metal salt solutions under controlled conditions in fluidized beds in heated reaction tubes. These are known as aging units for catalysts. As metal salt solutions, it is possible to use, for example, vanadium salt solutions or nickel salt solutions. As an alternative, it is also possible to spray the catalysts with solutions in which the metals are present in the form of metal-organic compounds. Wetting of the catalysts under controlled conditions is thus possible. The organic compounds are removed by burning-off in a thermal treatment step. Here, it is possible to use temperatures in the range of 500-700° C.

Another advantage of the apparatus of the invention is that the formation of carbonaceous material at the end of the liquid outlet is efficiently suppressed. The formation of carbonaceous material in the injection of oils into reaction spaces which are operated at high temperatures above 400° C. represents a great technical problem since oil injection is either interfered with or completely blocked as a result. Blocking of the oil injection leads to the study having to be stopped. The apparatus has to be taken apart and cleaned.

Here, it should also be noted that the apparatus of the invention and the process of the invention can have different configurations depending on the field of use, i.e. use in metal impregnation or use in laboratory FCC catalyst testing apparatuses. The reason is that apparatuses for metal impregnation are generally charged with relatively large amounts of catalyst. The individual impregnation tubes have a catalyst charge in the range from 50 to 200 g. It is in such a case frequently necessary to spray a relatively large amount of liquid into the reaction space and onto the catalyst. It is therefore possible for a plurality of injection apparatuses according to the invention to lead into a single reactor. For example, a single reaction tube can be equipped with from two to six apparatuses according to the invention for the injection of oils. The individual apparatuses can, depending on the configuration of the aging apparatus, all spray feed liquid into the impregnation tubes at the same time or be operated individually.

The configuration of the openings is not restricted to a single coaxial or circular arrangement of the capillary line in the interior space and the liquid-conveying line as outer tube. It is also possible for two or more capillary lines to be located in the interior space of the outer line (2) (see FIG. 2.*b*). The capillary can likewise have different geometric shapes. Apart from a round or elliptical cross-sectional area, it is also possible for the capillary lines to have, for example, a hexagonal shape, a square shape or a triangular shape. Embodiments of these types are shown in FIG. 2.*c*. The length of the capillary can be from a few millimeters up to a number of meters. The length of the capillary line is preferably in the range of 1-150 cm; preference is also given to a length in the range of 3-100 cm, particularly preferably a length in the range of 3-20 cm. The capillary lines are preferably made of metal, steel, glass, silica, ceramic, plastic. Particularly preferred materials are steel or fused silica.

Another characteristic of the process of the invention is that reagglomeration or coagulation of the atomized liquid droplets is very low.

The process of the invention can be used for the atomization of both low-viscosity liquids and high-viscosity liquids.

It may be mentioned here that the high-viscosity liquids (i.e. liquids having a low flowability) have a significantly better tendency to form droplets than low-viscosity liquids (i.e. liquids having a high flowability). For example, water has a viscosity at 20° C. of 1.001 mPa*s and dodecane has a viscosity of 1.520 mPa*s. In connection with the process of the invention, dodecane thus has a higher tendency to form droplets than water.

Use in the FCC Sector

Preference is given to using the apparatus of the invention and the process of the invention for the injection of oils in combination with catalyst testing setups for testing FCC catalysts. It is particularly advantageous that the process is very easy to control; in FCC tests, precise control of the introduction of feed fluid or the introduction of oil is of great importance, especially the introduction of amounts in the range from 0.1 to 50 g/min, preferably 0.5-10 g/min.

The catalyst has a temperature in the range from 600° C. to 800° C., while the temperature of the feed liquid is in the range of 50 to 300° C., preferably in the range from 100 to 250° C. An upper temperature limit is imposed by thermal cracking of the liquids otherwise occurring, which has an adverse effect on the tests. A particular minimum temperature is necessary, in particular, when the oils have to be liquefied first.

The temperature in the reaction space of the catalyst testing setup is 550° C., with the oil, which is, for example, preheated to 250° C., being injected under controlled conditions into the reaction space. It should be noted that the process of the invention is much better for achieving very homogeneous mixing of the oil droplets and the catalyst particles at this point so that they can react under controlled conditions. The apparatus of the invention and the process of the invention result in the oil being atomized very finely and the atomized oil being able to be brought into intimate contact with the catalyst within a few milliseconds. Here, the oil is also heated, for example in the present case to 550° C. The processes of atomization of the oil and wetting of the catalyst with oil proceed simultaneously.

EXAMPLES

I. To illustrate the apparatus of the invention and the process of the invention, an apparatus corresponding to the schematic depiction shown in FIG. 1 was constructed. To produce the needle injector, a fused silica capillary having an internal diameter of 50 μm and a length of 30 cm was introduced into a ¹⁄₁₆" steel tube (¹⁄₁₆" external diameter corresponds to an internal diameter of 1.387 mm since the steel tube has a wall thickness of about 0.1 mm) of the same length. A gas supply was connected to an end piece of the fused silica capillary and a liquid supply was connected to an end piece of the steel capillary. The injector equipped with gas supply and liquid supply was positioned vertically in a holder in which the tip of the needle injector was arranged 8 cm above a plate. A rectangular paper strip (4 cm×10 cm) was placed on the upper side of the plate underneath the tip of the needle injector. Gas and liquid were conveyed in a controlled manner through the needle injector by means of the gas supply and the liquid supply. The liquid supply was 5 ml/min and the gas supply was 80 ml/min. Spray injections were carried out by means of the apparatus. An intrinsically stable spray mist was produced on exit of the fluids from the ends of the tubes at the tip of the needle injector. The spray mist was collected on the paper strip which had been placed underneath the injector. Ink (a colored aqueous solution) was used as liquid for the spray experiments. In the region underneath the exit opening of the injector needle, a spray mist having a conical shape was observed. No shape changes were to be seen over an observation period of 10 minutes. The spray cone thus had a constant shape. FIG. 3 shows a photo of a spray cone which has an opening angle of 14°. Individual droplets are below the optical resolution limit and cannot be seen. The stability of the very fine mist enables a droplet size of from 10 μm to 20 μm to be concluded.

II. Supporting of an Organic Dye to Produce a Pigment

To illustrate the process of the invention, a pulverulent solid which consisted of an aluminum oxide-comprising support oxide from Alcoa was coated with eosin-comprising ink. The aluminum oxide-comprising support oxide was an FCC catalyst material which had been produced by means of a spray dryer from a spraying suspension, in which the initial components were present. The eosin-comprising red ink was dissolved in acetone, employing a volume ratio of 1:10 (i.e. 1 part of ink to 10 parts of acetone). Eosin is tetrabromofluorescein or the disodium salt of 2',4',5',7'-tetrabromo-3',6'-dihydroxyspiro[2-benzofuran-3,9'-xanthen]-1-one. The concentration of eosin dye (tetrabromofluorescein) in the ink was 1 mol/l. The aluminum oxide-comprising support oxide had an average particle size of 85 μm, with the size distribution of the particles being in the range 50-120 μm, so that the particles could be brought into the fluidized state by means of a gas stream. The pulverulent aluminum oxide (250 g) was introduced into a heated reaction tube which was provided with an injector according to the invention. The diameter of the reaction tube was 6 mm, and the length was 1 m. The reaction tube was maintained at 80° C. A gas stream was introduced via feed nozzles into the reaction tube, as a result of which the pulverulent aluminum oxide was brought into the fluidized state. While the fluidized aluminum oxide was stored at 80° C. in the feed vessel, spray injection of the eosin solution was carried out for a time of 60 seconds, with the injection being carried out at a flow rate of 10 ml/min. Thus, 10 ml of eosin-acetone solution were injected. In the present case, 250 g per minute of the pulverulent support material were coated under controlled conditions with the dye by means of the apparatus of the invention and the process of the invention. The reaction time or the coating time was carried out in a few milliseconds, with the acetone being separated off directly via the gas phase. (The residence time in the reaction tube was in the range of 2-6 seconds.) The residence time is determined from the gas flow and the proportion of hydrocarbon which is vaporized. The vaporized proportion of hydrocarbon thus increases the volume of the gas stream. In the present case, acetone as solvent for the eosin-comprising dye was vaporized in the reaction tube. The red-coated support was collected downstream of the reaction tube. Analysis of the coated support material indicated that a very uniform and homogeneous distribution of the dye on the individual particles was present.

This process of the invention is, apart from the discontinuous operation presented, suitable for being operated continuously and is therefore particularly suitable for carrying out, for example, supporting on a semiindustrial scale. In the case of continuous operation of the apparatus described in the example, an amount of catalyst of 360 kg/day can be impregnated or coated under the conditions presented here by means of the process of the invention. To carry out the process continuously, the apparatus components for introduction of catalyst, the catalyst receptacle and the reservoir for the impregnation solution had to be appropriately enlarged and adapted. In the apparatus described here, up to 500 kg/day of material can be reacted or treated after appropriate adaptation of the apparatus. In a further embodiment of the apparatus of the invention, the reaction tubes can also be arranged in parallel. In this way, the process can be operated in an even more efficient way since both the high accuracy of the process for coating or impregnation can be utilized and the advantageous configurational possibilities of the apparatus can lead to improved efficiency in operation of the apparatus. Two or more parallel reaction tubes which are provided in conjunction with a joint reservoir for impregnation or coating fluid are advantageous. For example, the apparatus of the invention can, in one embodiment having four reaction tubes arranged in parallel can be used for coating an amount of catalyst of 1.4-2 metric tons per day. Advantages are that the apparatus can have only small dimensions with a reaction tube having a length of one meter and a diameter of 6 mm and the process can be carried out in a short time. At the dimensions of the reaction tube indicated in the example and based on the density of the aluminum oxide of 4 g/cm, from 40 g/min to 250 g/min of material can be coated in this way. In the field of specialty chemicals, daily productions of 1-2 metric tons per day can represent an amount which is of great economic importance.

The embodiments of the apparatus of the invention presented here are not to be interpreted as exhaustive or limiting in any way. In a further embodiment of the apparatus, two or more reaction tubes can be connected in series, with different impregnation or coating solutions being applied to the catalyst material or support material being passed through.

LIST OF REFERENCE NUMERALS 1, 1', 1"—capillary line in various configurations
2—outer tube for liquid supply/oil supply
3—housing
4—gas supply
5—liquid supply
6—heating device
8—injector tip
9—contact space, reaction space
12—flow direction
13—joint liquid supply for injectors d1, d2, d3
14—joint gas supply for the injectors d1, d2, d3
15—gas supply for fluidizing gas
16—screen or frit for screening the gas feed lines
d1, d2, d3—vertically arranged injectors, top of the setup
d4, d5—laterally arranged injectors, longitudinal axis of the injectors has a tilt angle relative to the vertical axis, tilt angle is <40°, preferably <30°, more preferably <25°

The invention claimed is:
1. An apparatus for spraying liquids, comprising:
a needle injector;
a liquid supply; and
a gas supply,
wherein:
the needle injector comprises a capillary line and an outer tube;
the internal diameter of the capillary line of the needle injector is in the range of 2-400 µm;
the capillary line is coaxially arranged in the interior space of the respective outer tube;
the capillary line is in active communication with the gas supply;
the outer tube is in active communication with the liquid supply; and
a tip of the needle injector is configured such the capillary line is longer than the outer tube.

2. The apparatus of claim 1, wherein the apparatus is joined to a housing.

3. The apparatus of claim 1, wherein the tip of the needle injector is configured such that a length difference between the capillary line and the outer tube is in the range of 1 to 10 mm.

4. The apparatus of claim 1, wherein the apparatus is configured for operation in conjunction with a catalyst testing setup for examining FCC catalysts and/or an aging or impregnation unit for FCC catalysts.

5. A process for spraying liquids with the apparatus of claim 1, wherein the process comprises:
(i) controlled introduction of a gas via the gas supply into the capillary line;
(ii) controlled introduction of a liquid via the liquid supply into the interior space of the outer tube; and
(iii) contacting of the liquid conveyed through the outer tube with the gas conveyed through the capillary line at a tip of the apparatus.

6. The process of claim 5, wherein the liquid which is conveyed through the outer tube has a volume flow in the range of 0.1-10 ml/min, and/or the gas which is conveyed through the capillary line has a volume flow in the range of 10-300 ml/min.

7. The process of claim 5, wherein the apparatus is joined to a housing, and
wherein the housing, the gas supply and/or the liquid supply are heated, with the temperature of the gas supply being in the range of 50-300° C.; the temperature of the liquid supply being in the range from 50-300° C.; and the temperature of the housing being in the range of 80-700° C.

8. The process of claim 5, comprising spraying a heavy oil.

9. The process of claim 5, comprising spraying an oil, wherein the oil is introduced in pulses or continuously and the pulses have a duration in the range of 1-400 seconds.

10. The process of claim 5, wherein the needle injector comprising the capillary line and the outer tube is arranged vertically.

11. The process of claim 5, wherein a very fine mist is produced by the process, having a mass flow ratio of gas to liquid of <0.1.

12. The process for of claim 5, wherein the process is controlled by a PC.

13. The apparatus of claim 1, wherein the tip of the needle injector does not comprise an internal mixing chamber.

* * * * *

UNITED STATES PATENT AND TRADEMARK OFFICE
CERTIFICATE OF CORRECTION

PATENT NO. : 10,562,050 B2
APPLICATION NO. : 15/565594
DATED : February 18, 2020
INVENTOR(S) : Josef Find et al.

It is certified that error appears in the above-identified patent and that said Letters Patent is hereby corrected as shown below:

On the Title Page

Page 2, Column 2, Item (56), Other Publications, Line 2, "with English." should read -- (with English --.

Page 2, Column 2, Item (56), Other Publications, Line 4, "Searah" should read -- Search --.

Page 2, Column 2, Item (56), Other Publications, Line 4, "catagories" should read -- categories --.

In the Claims

Column 12, Line 61, Claim 12, "for of" should read -- of --.

Signed and Sealed this
Fourteenth Day of July, 2020

Andrei Iancu
*Director of the United States Patent and Trademark Office*